3,092,611
HOMOPOLYMER AND COPOLYMERS OF
VINYL CYANOACETATE
John W. Lynn, Charleston, W. Va., assignor to Union
Carbide Corporation, a corporation of New York
No Drawing. Filed Sept. 15, 1959, Ser. No. 840,032
4 Claims. (Cl. 260—78.4)

This invention relates to vinyl cyanoacetate as a new composition of matter, and to its preparation by the reaction of vinyl acetate with cyanoacetic acid. This invention also relates to the polymerization of this novel composition of matter.

According to the process of the instant invention, vinyl cyanoacetate can be prepared by reacting vinyl acetate with cyanoacetic acid in the presence of a suitable catalyst. Since vinyl acetate and cyanoacetic acid are commercially available materials, the process of the instant invention provides a convenient method of preparing vinyl cyanoacetate. The preparation of this novel monomer can be illustrated by the following graphic equation:

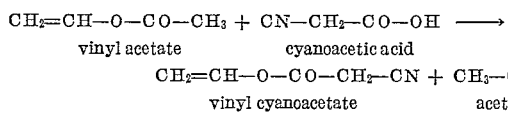

Because of the presence of various functional groups therein, vinyl cyanoacetate is an extremely useful intermediate for the preparation of numerous other organic compounds. By way of illustration, vinyl cyanoacetate can be readily polymerized through the vinyl group present therein to produce various polymeric materials. In addition, the high activity of the methylene group situated between the cyano and carbonyl radicals present in vinyl cyanoacetate and its polymers provides a convenient site through which chemical modification of such compounds, and cross-linking of the polymers, can be achieved.

When effecting reaction between vinyl acetate and cyanoacetic acid according to the process of the instant invention, it is preferable to employ a substantial excess of vinyl acetate over the stoichiometric amount required to react with the cyanoacetic acid present in order to help drive the reaction to completion. Amounts of vinyl acetate of from 5 to 10 times the stoichiometric equivalent are preferred for this purpose, but amounts of from as little as 1 mole to as much as 20 moles per mole of cyanoacetic acid present can also be employed; however, when an amount of vinyl acetate which is less than 5 times the stoichiometric equivalent is employed, the yield of vinyl cyanoacetate is considerably lowered.

In order to effect reaction between vinyl acetate and cyanoacetic acid according to the process of the instant invention, the presence of a mercuric sulfate catalyst in the reaction mixture is essential. For best results, the catalyst is preferably prepared in the presence of the vinyl acetate. This may be accomplished, for example, by admixing a compound such as mercuric acetate with the vinyl acetate and adding sulfuric acid thereto.

The mercuric sulfate salt employed as catalyst in effecting reaction between vinyl acetate and cyanoacetic acid according to the process of the instant invention can be employed in an amount of from as low as 0.01 percent by weight to as high as 1 percent by weight, preferably from 0.1 percent by weight to 0.5 percent by weight, of the weight of cyanoacetic acid employed.

Reaction according to the process of the instant invention readily occurs at temperatures ranging from as low as 0° C. to as high as 100° C., but is preferably effected at temperatures ranging from about 20° C. to about 40° C.

Atmospheric pressure is usually employed in effecting reaction according to the process of the instant invention. However, superatmospheric pressures ranging up to about 1000 p.s.i. can also be employed whenever it is desirable to do so.

Because of the vinyl group present therein, vinyl cyanoacetate can be readily polymerized to produce various polymeric materials. Thus, for example, this novel monomer can be homopolymerized, or copolymerized with certain alpha-ethylenically-unsaturated organic compounds, such as styrene, butadiene, methyl acrylate, methyl methacrylate, vinyl chloride, vinylidene chloride, acrylonitrile, methacrylonitrile, vinylidene cyanide, acrylamide, methacrylamide, vinyl methyl ether and the like. The polymeric materials produced by polymerizing vinyl cyanoacetate are useful in forming films, fibers and coatings.

Polymerization of vinyl cyanoacetate can be effected by conventional means. For example, polymerization can be effected by means of heat, light, or a suitable vinyl polymerization catalyst, such as a peroxide or azo compound. Preferably polymerization is effected by heating in the presence of a polymerization catalyst in order to shorten the reaction time. Temperatures ranging from as low as 0° C. to as high as 100° C. are generally effective for this purpose. Among the peroxides which can be employed as catalysts may be mentioned hydrogen peroxide, barium peroxide, magnesium peroxide, diethyl peroxide, distearyl peroxide, acetyl peroxide, stearoyl peroxide and acetyl benzoyl peroxide. Specific examples of the azo compounds which can be employed include $\alpha,\alpha'$-azodiisobutyronitrile and 2,2'-dicyanoazobenzene.

The copolymers obtained by copolymerizing vinyl cyanoacetate generally contain from as low as 1 molar percent to as high as 50 molar percent of combined vinyl cyanoacetate.

The following examples are set forth for purposes of illustration so that those skilled in the art may better understand my invention, and it should be understood that they are not to be construed as limiting my invention in any manner.

EXAMPLE 1

*Preparation of Vinyl Cyanoacetate*

To 1023 grams (11.9 moles) of vinyl acetate were added 6 grams of mercuric acetate. The resulting mixture was stirred for one hour at room temperature in order to effect solution. A solution of 3 grams of sulfuric acid in 15 ml. of acetic acid was then added thereto in a drop-wise manner over a period of one hour with constant stirring. After the addition was complete, 170 grams (2 moles) of cyanoacetic acid were added rapidly, and the resulting mixture was stirred at room temperature for 80 hours. At the end of this time, about 0.2 gram of hydroquinone and 5 grams of sodium acetate were added to the mixture. The purpose of the hydroquinone was to inhibit vinyl polymerization, while the purpose of the sodium acetate was to neutralize the catalyst. The resulting mixture was then distilled under reduced pressure and 86 grams of distillate boiling at a temperature of from 50° C. to 65° C. at 2 mm. Hg pressure were collected. This portion of the distillate was redistilled and 65 grams of vinyl cyanoacetate boiling at a temperature of from 59° C. to 60° C. at 2 mm. Hg pressure were collected. This represented a yield of about 29.4 percent of theoretical. This material had an index of refraction of 1.4369 at 30° C., and was identified by its infrared absorption spectrum and chemical analysis.

*Analysis.*—Calculated for $C_5H_5NO_2$: C, 54.05%; H, 4.53%; N, 12.60%. Found: C, 53.97%; H, 4.87%; N, 12.58%.

EXAMPLE 2

*Copolymerization of Vinyl Cyanoacetate With Vinylidene Chloride*

To a reaction vessel were charged 30 parts by weight of vinyl cyanoacetate, 70 parts by weight of vinylidene chloride and 1 part by weight of azo-bis-isobutyronitrile. The vessel was heated with agitation for 20 hours in a bath maintained at a temperature of 50° C. Upon cooling, isopropyl ether was added to the mixture and the precipitate obtained thereby was washed with isopropyl ether and dried by heating. About 6 percent of the theoretical yield of copolymer was obtained in this manner. The copolymer, a white friable solid, was composed of about 2.1 percent by weight of vinyl cyanoacetate and 97.9 percent by weight of vinylidene chloride, and had a reduced viscosity of 0.03 in cyclohexanone.

Reduced viscosity ($I_R$) is a measure of the molecular weight of a polymer, and may be defined by the equation $$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and $C$ is the concentration of polymer in said solution in grams per 100 ml. of solution. Measurements were made at 30° C. using cyclohexanone as solvent, and a solution of 0.2 gram of polymer per 100 ml. of solution.

Unless otherwise specified, all parts and percentages, as used throughout this specification, are by weight.

What is claimed is:
1. A homopolymer of vinyl cyanoacetate.
2. A copolymer of vinyl cyanoacetate and vinylidene chloride.
3. A process for producing a homopolymer of vinyl cyanoacetate which comprises forming a mixture of vinyl cyanoacetate and a vinyl polymerization catalyst, and heating said mixture at an elevated temperature to cause homopolymerization of said vinyl cyanoacetate.
4. A process for producing a copolymer of vinyl cyanoacetate and vinylidene chloride which comprises forming a mixture of vinyl cyanoacetate, vinylidene chloride, and a vinyl polymerization catalyst, and heating said mixture at an elevated temperature to cause copolymerization of said vinyl cyanoacetate and said vinylidene chloride.

References Cited in the file of this patent

UNITED STATES PATENTS

| | | |
|---|---|---|
| 2,245,131 | Hermann et al. | June 10, 1941 |
| 2,299,862 | Toussaint et al. | Oct. 27, 1942 |
| 2,465,316 | Mowry et al. | Mar. 22, 1949 |
| 2,469,836 | Milone | May 10, 1949 |
| 2,677,676 | Nichols et al. | May 4, 1954 |
| 2,719,834 | Craig | Oct. 4, 1955 |
| 2,808,331 | Unruh et al. | Oct. 1, 1957 |